May 16, 1950     G. A. CROWTHER     2,507,890
SINE AND COSINE FUNCTION VOLTAGE DEVICE
Filed Nov. 19, 1947     3 Sheets-Sheet 1
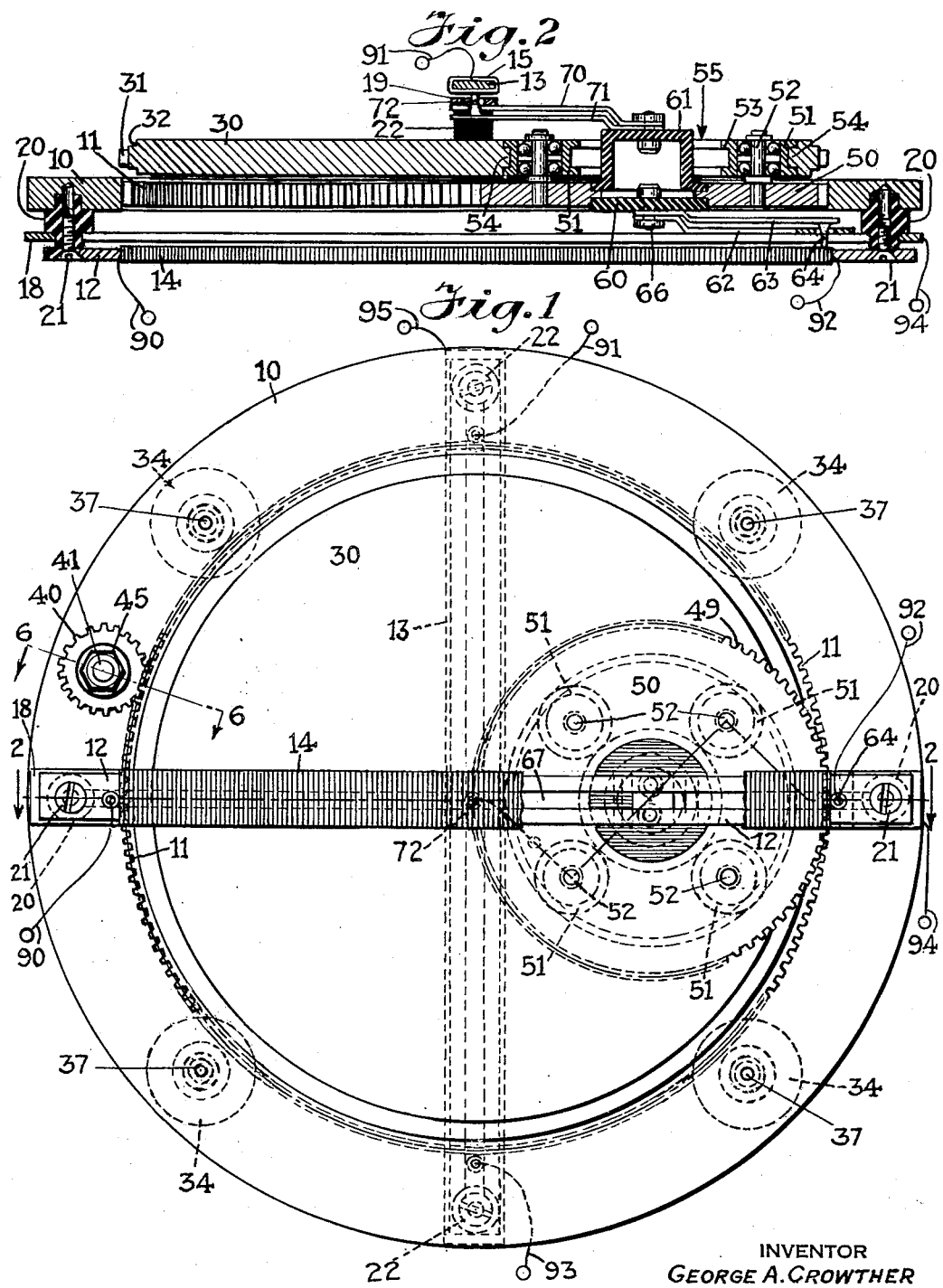
INVENTOR
GEORGE A. CROWTHER
BY
Victor D. Borst
HIS ATTORNEY

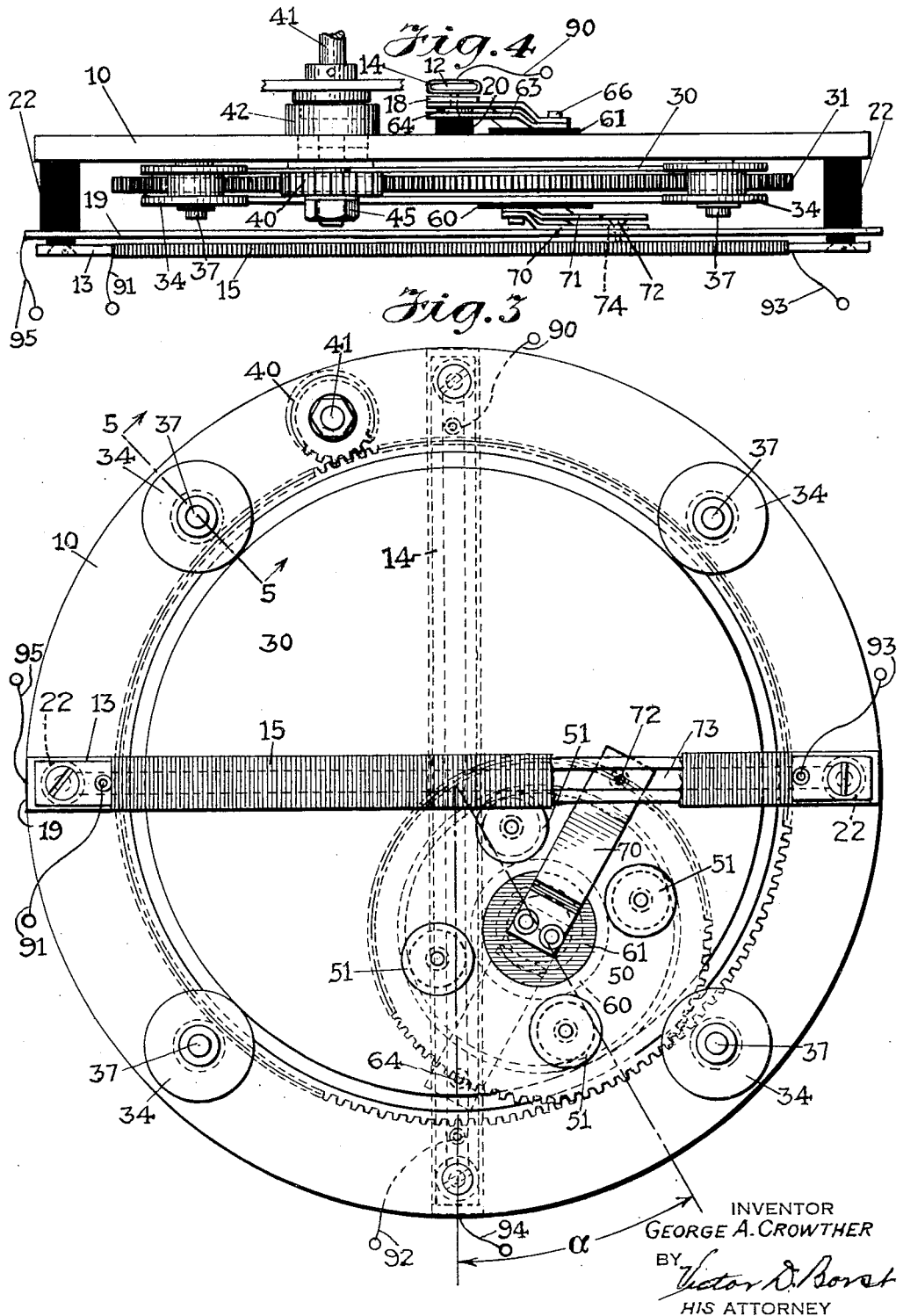

May 16, 1950  G. A. CROWTHER  2,507,890
SINE AND COSINE FUNCTION VOLTAGE DEVICE
Filed Nov. 19, 1947  3 Sheets-Sheet 3
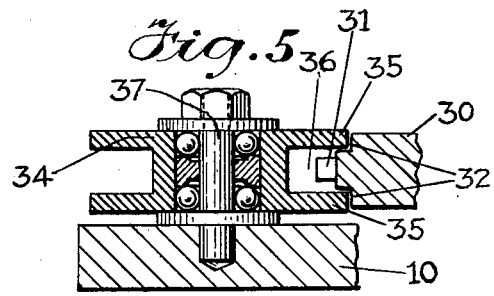
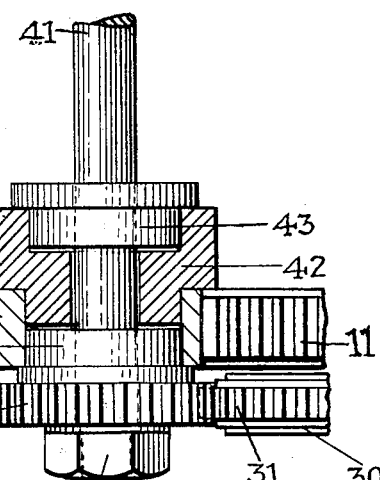
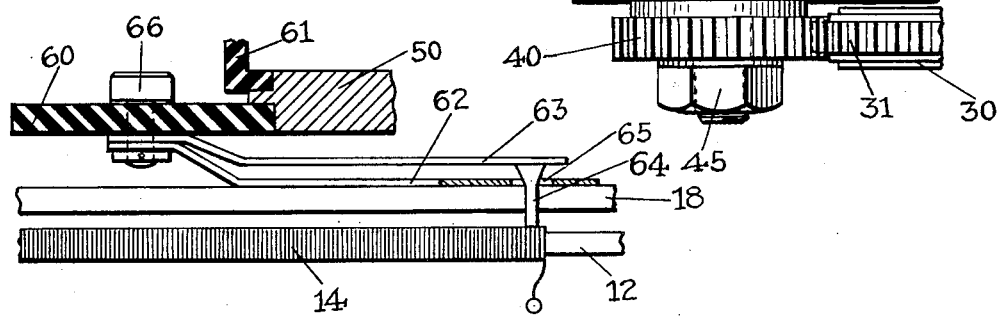
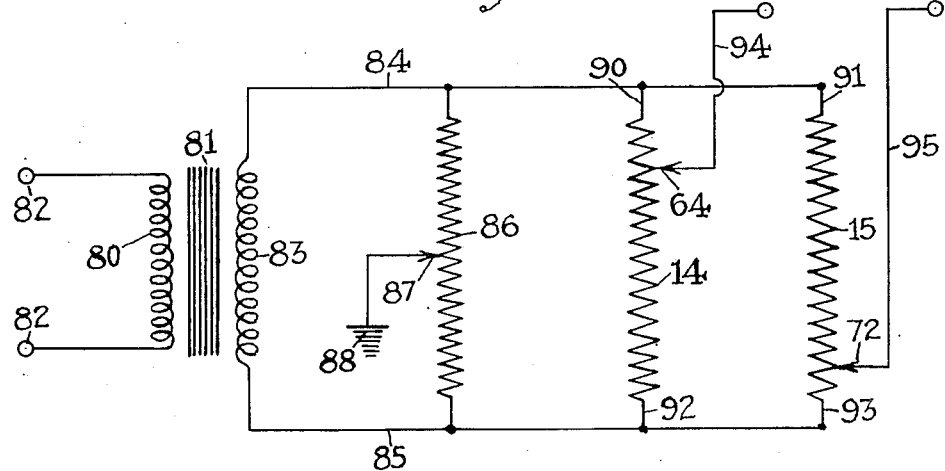
INVENTOR
GEORGE A. CROWTHER
BY
HIS ATTORNEY Patented May 16, 1950

2,507,890

UNITED STATES PATENT OFFICE 2,507,890

SINE AND COSINE FUNCTION VOLTAGE DEVICE

George A. Crowther, Manhasset, N. Y., assignor to The Sperry Corporation, a corporation of Delaware Application November 19, 1947, Serial No. 786,998

5 Claims. (Cl. 235—61)

This invention relates to a device for producing voltages which are proportional to selected functions of an angle and more particularly to a mechanically operated device for deriving voltages which are functions of the sine and co-sine, respectively, of the angle which is set into the device.

An object of the invention is to provide an accurate and dependable device of the type above indicated.

Various other objects and advantages will be apparent as the nature of the invention is more fully disclosed.

The present invention is based on the fact that the hypocycloid traced by a point on the periphery of the inner gear of an epicyclic train rotating around the inner periphery of an outer gear which is twice the diameter of the inner gear is a straight line extending along the diameter of the outer gear. I accordingly provide a linear resistance which extends along the diameter of the outer gear along which a contact carried by an arm on the inner gear advances. The relationship is such that the distance between the contact and the center of the resistance represents either the sine or the co-sine of the angular position of the internal gear. If a voltage drop is impressed across the resistance, the voltage between the point of contact and the center of the resistance represents the corresponding angular function.

Although the novel features which are characteristic of this invention are pointed out more in detail in the claims appended hereto, the nature of the invention will be better understood by referring to the following description, taken in connection with the accompanying drawings, in which a specific embodiment thereof has been set forth for purpose of illustration. In the drawings:

Fig. 1 is a top plan view of a device embodying the present invention;

Fig. 2 is a section taken on the line 2—2 of Fig. 1;

Fig. 3 is a bottom plan view of the device with the internal gear in a different position;

Fig. 4 is a side elevation of the device;

Fig. 5 is a partial detail sectional view on an enlarged scale taken along the line 5—5 of Fig. 3;

Fig. 6 is a partial detail sectional view on an enlarged scale taken along the line 6—6 of Fig. 1;

Fig. 7 is a detail view on an enlarged scale of a contact arm; and

Fig. 8 is a schematic wiring diagram.

Referring to the drawings more in detail, the device is shown as comprising a stationary ring 10 having internal gear teeth 11 which form the outer gear of the epicyclic train. Extending diametrically across this ring 10 on opposite sides thereof and arranged at right angles to each other are a pair of rods 12 and 13, respectively, carrying wound resistance windings 14 and 15 and a pair of contact strips 18 and 19, respectively, having longitudinal slots therein for the purpose to be described. The contact strip 18 and rod 12 are supported by insulated bushings 20 which are secured to the ring 10 by screws 21 (Fig. 2). The rod 13 and contact strip 19 are secured to the other side of the ring 10 by insulated bushings 22 (Fig. 4).

A disc 30 is mounted concentric with the ring 10 and is provided with external gear teeth 31 and peripheral shoulders 32. The disc 30 is rotatably mounted in spools 34 having annular flanges 35 engaging the shoulders 32 and forming a channel 36 therebetween to receive the external teeth 31 of the disc 30. The spools 34, as shown in Fig. 5, are mounted on ball bearings on studs 37 attached to the ring 10.

The disc 30 is driven by a pinion 40 (Figs. 1 and 6) secured by a nut 45 to an input shaft 41 journalled in ball bearings 43 mounted in a bushing 42 and the ring 10. The shaft 41 constitutes an input by means of which the angle whose functions are to be measured is fed into the disc 30.

An epicyclic gear 50 which is one-half of the diameter of the inner periphery of the ring 10 is provided with external teeth 49 engaging the internal teeth 11 of the gear 10 and is mounted in alignment therewith by means of a plurality of spools 51 which are journalled on studs 52 carried by the gear 50 and are formed with flanges 53 which span the internal flange 54 of an opening 55 in the disc 30. The gear 50 is free to rotate within the disc 30 as the spools 51 rotate around the inner periphery of the opening 55.

The gear 50 is provided with a central opening in which an insulating disc 60 and an insulating cup 61 are secured. The disc 60, as shown in detail in Fig. 7, carries a spring arm 62 which engages the contact strip 18 and a spring arm 63 carrying a contact pin 64 extending through an aperture 65 in the arm 62 and through the longitudinal slot 67 in the strip 18 to engage the winding 14 on the bar 12. The arms 62 and 63 are held in electrical contact by screws 66 by means of which they are secured to the disc 60 and provide an electrical contact between the contact strip 18 and the point of contact of the pin 64 with the winding 14. Similar arms 70 and 71 are carried by the cup 61. The arm 70 engages the contact strip 19 and the arm 71 carries a pin 72 extending through an aperture 74 in the arm 70 and through the longitudinal slot 73 in the strip 19 to engage the winding 15 on the bar 13. The pins 64 and 72 are diametrically opposed on the gear 50 and are spaced apart by a distance corresponding to one-half of the pitch diameter of the internal gear teeth on the ring 10.

Referring to Fig. 8 the system is shown as connected to derive an alternating voltage. In this figure the primary 80 of a transformer 81 is connected to an A. C. line 82 and the secondary 83 thereof is connected to leads 84 and 85. For maintaining the voltage on the leads 84 and 85 equal and opposite with respect to ground, a resistor 86 is connected across these leads and a center tap 87 is grounded as at 88. The line 84 is connected to leads 90 and 91 which are connected to one side of the resistance windings 14 and 15, respectively. The lead 85 is connected to leads 92 and 93 which are connected to the other side of the resistance windings 14 and 15. A lead 94 is connected to the contact strip 18 and a lead 95 is connected to the contact strip 19.

The purpose of the center ground connection 88 is to maintain the centers of the windings 14 and 15 at ground potential without requiring a lead to these windings themselves. Obviously if the center of the secondary 83 is grounded the resistor 86 could be omitted. Also, if a D. C. voltage is to be measured the transformer secondary 83 may be replaced by a battery or other D. C. source, the center of which is grounded so as to maintain the leads 84 and 85 at opposite potentials.

In the operation of this device the angle whose function is to be measured is set into the shaft 41 and, through the gear 40 and the external gear on the disc 30, drives the disc 30 through a corresponding angle. The rotation of the disc 30 causes the internal epicyclic gear 50 to roll around the inside of the ring 10 and, as pointed out above, causes the pins 64 and 72 to move in straight lines across the corresponding resistance windings 14 and 15. In the position shown in Figs. 1 and 2, the axis of the gear 50 lies directly under the resistor 14. In this position the pin 64 is in contact with the extreme end of the resistance winding 14 and the pin 72 is in contact with the center of the resistance winding 15. Assuming this to be the zero angle position, the voltage drop between the pin 64 and the center of the winding 14 represents the co-sine of the angle which in this case is unity, and the voltage drop between the pin 72 and the center of the winding 13 represents the sine of the angle which in this case is zero. If the disc 30 is driven to the position shown in Figs. 3 and 4, the axis of the gear 50 is advanced around the ring 10 by an angle $a$ and the pins 64 and 72 are shifted along the windings 14 and 15 to positions the distance from which to the respective centers correspond to the co-sine and sine of the angle $a$. Hence the voltage between the leads 95 and 94 and ground are proportional to the sine and co-sine, respectively, of the angle $a$.

It will be noted that these voltages vary from zero at the center of the respective windings 14 and 15 in a plus or minus direction, depending upon whether the disc 30 is shifted in a clockwise or counterclockwise direction. Hence the sign of the voltage indicates the direction of movement of the disc 30 and the value of the voltage represents the sine and co-sine of the actual angle of movement. The voltages may of course be used in electrical computing apparatus for various purposes.

Although a specific embodiment of the invention is shown for purposes of illustration, it is to be understood that various changes and adaptations may be made therein as will be readily apparent to a person skilled in the art and that the invention may be applied to various uses. The scope of the invention is only to be restricted in accordance with the following claims.

What is claimed is:

1. An apparatus for deriving a voltage which represents a function of either the sine or cosine of an angle, comprising an outer ring member and an inner disc member connected to rotate around the inner periphery thereof as an epicyclic train, said inner member having a diameter one-half the internal diameter of said ring member, a linear resistance carrying a current extending diametrically across said ring member, a contact carried at the periphery of said inner member adapted to advance linearly along said resistance due to the rotation of said members, and electrical connections to said resistance and to said contact to derive from said resistance a voltage representing the linear distance of said contact from the center of said resistance.

2. An apparatus for deriving a voltage which represents a function of the sine and co-sine of an angle, comprising a stationary ring member having internal gear teeth, a disc mounted concentric therewith, means rotating said disc through an angle representing the angle to be measured, an epicyclic gear member rotatably mounted on said disc and engaging the internal teeth of said ring member and having a diameter equal to one-half the diameter of said ring member, a linear resistance carrying a current mounted on each side of said ring member and extending diametrically thereacross, the two resistances being disposed at right angles to each other, contacts carried by said epicyclic gear in diametrically opposite positions and adapted to engage the respective resistances, and electrical connections to said resistances and to said contacts for deriving from the resistances voltages proportional to the displacement of said contacts from the center of the respective resistances.

3. A device as set forth in claim 2 in which stationary contact strips are mounted adjacent said resistances and said contacts are arranged to make contact between said strips and said resistances, whereby said contact strips provide electrical connections to said contacts.

4. An apparatus as set forth in claim 3 in which said contacts each comprise a pair of spring arms adapted to make contact, respectively, with said strips and with said resistances.

5. An apparatus as set forth in claim 4 in which electrical connections are made to the two ends of said resistances and to said contact strips and equal and opposite voltages are applied to the two ends of said resistances.

GEORGE A. CROWTHER.

REFERENCES CITED

The following references are of record in the file of this patent:

UNITED STATES PATENTS

| Number | Name | Date |
|---|---|---|
| 1,940,102 | Roberton | Dec. 19, 1933 |
| 2,080,186 | Reymond | May 11, 1937 |
| 2,416,363 | Wellings | Feb. 25, 1947 |